United States Patent [19]

Barmatz et al.

[11] Patent Number: 4,736,815

[45] Date of Patent: Apr. 12, 1988

[54] SINGLE MODE LEVITATION AND TRANSLATION

[76] Inventors: Martin B. Barmatz, 3481 Stancrest Dr., #211, Glendale, Calif. 91208; James L. Allen, 2951 Alabama St., La Crescenta, Calif. 91214

[21] Appl. No.: 789,266

[22] Filed: Oct. 18, 1985

Related U.S. Application Data

[63] Continuation-in-part of Ser. No. 627,537, Jul. 3, 1984, Pat. No. 4,573,356.

[51] Int. Cl.[4] ........................ F16C 32/00; G10K 11/00

[52] U.S. Cl. ........................................ 181/0.5; 73/505; 367/191

[58] Field of Search ..................... 60/721; 73/502, 505; 156/DIG. 62, DIG. 66; 181/0.5; 310/300, 322, 334; 364/453; 367/191; 414/787

[56] References Cited

U.S. PATENT DOCUMENTS 3,882,732 5/1975 Fletcher et al. ................. 181/0.5 X
4,052,181 10/1977 Fletcher et al. .................. 73/505 X
4,139,806 2/1979 Kanber et al. .................... 60/721 X
4,218,921 8/1980 Oran et al. ........................... 73/505
4,284,403 8/1981 Rey .................................. 181/0.5 X
4,393,706 7/1983 Barmatz ................................ 60/721
4,393,708 7/1983 Barmatz et al. ........................ 73/505
4,402,221 9/1983 Lee et al. .......................... 181/0.5 X
4,420,977 12/1983 Elleman et al. .................. 60/721 X
4,447,251 5/1984 Dunn et al. ........................... 73/505
4,463,606 8/1984 Barmatz ................................ 73/505
4,520,656 6/1985 Barmatz et al. ........................ 73/505
4,521,854 6/1985 Rhim et al. ................. 156/DIG. 62
4,523,682 6/1985 Barmatz et al. ................. 181/0.5 X
4,549,435 10/1985 Barmatz et al. ....................... 73/505
4,573,356 5/1986 Barmatz et al. ........................ 73/505

*Primary Examiner*—Deborah L. Kyle
*Assistant Examiner*—Brian S. Steinberger

[57] ABSTRACT

An apparatus is described for acoustically levitating an object within a chamber by the application of acoustic energy of a single frequency resonant mode, which enables smooth movement of the object and suppresses unwanted levitation modes that would urge the object to a different levitation position. A plunger forms one end of the chamber, and the frequency changes as the plunger moves. Acoustic energy is applied to opposite sides of the chamber, with the acoustic energy on opposite sides being substantially 180° out of phase.

13 Claims, 3 Drawing Sheets

SINGLE MODE LEVITATION AND TRANSLATION

ORIGIN OF INVENTION

The invention described herein was made in the performance of work under a NASA contract, and is subject to the provisions of Public Law 96-517 (35 USC 202) in which the Contractor has elected not to retain title.

CROSS REFERENCE TO RELATED APPLICATION

This is a continuation-in-part of U.S. patent application Ser. No. 627,537 filed July 3, 1984, which has issued as U.S. Pat. No. 4,573,356 issued Mar. 4, 1986.

BACKGROUND OF THE INVENTION

There are applications where it is desirable to acoustically levitate an object within a chamber, so the object is spaced from all walls of the chamber, and to move the object in a controlled way. A single frequency can be used to levitate an object against movement in any direction. It would be desirable if a single frequency could be used not only to levitate an object, but also to move the object smoothly within the chamber, as between heated and cool regions. It also would be desirable to suppress unwanted chamber modes, which could urge the object away from the desired levitation position.

SUMMARY OF THE INVENTION

In accordance with one embodiment of the present invention, a system is provided for levitating an object within a chamber by application of a single acoustic levitation mode, which permits controlled movement of the object and suppresses unwanted modes. Acoustic energy is applied to a chamber, of a frequency that establishes a single frequency resonant mode. The acoustic energy is applied to substantially diametrically opposite sides of the chamber. The acoustic energy at the opposite sides are of the same frequency but are substantially 180° out of phase. The out of phase acoustic energy suppresses plane waves that would reflect solely between opposite ends of the chamber, while permitting the establishment of considerable acoustic pressure of the single frequency resonant mode.

The object can be moved within the chamber by altering the chamber length, as by movement of a plunger which forms one end of the chamber. During such change in length, the single levitation frequency is changed to maintain the single frequency resonant levitation mode.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
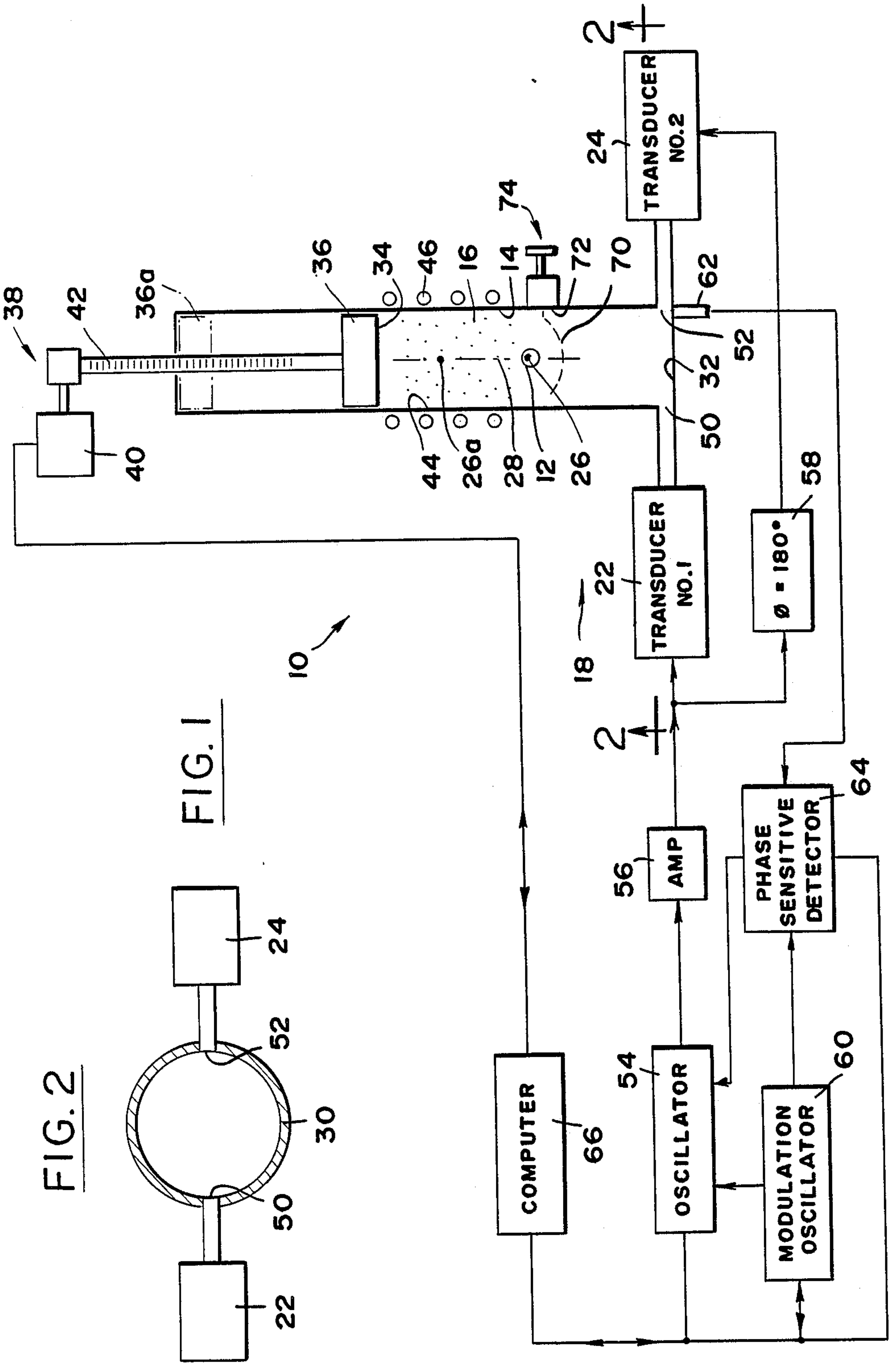
FIG. 1 is a block diagram and side elevation view of a levitation apparatus in accordance with one embodiment of the invention.
FIG. 2 is a view taken on the line 2—2 of FIG. 1.

FIG. 1 illustrates an apparatus 10 for acoustically levitating an object 12 within a largely cylindrical chamber 14 filled primarily with gas 16. A transducer means 18 formed by a pair of electro-acoustic transducers 22, 24 applies acoustic energy to the chamber, of a frequency which is resonant to the chamber. The frequency of the acoustic energy produces a single frequency resonant mode in the chamber which applies forces in three dimensions that urges objects to at least one levitation position such as 26 which lies along the axis 28 of the chamber. The object 12 is therefore maintained near the levitation position where the object is spaced from the walls of the chamber. The object can be heated to a molten temperature and still remain uncontaminated by the walls of the chamber.

The cylindrical chamber has side walls 30 at the periphery of the cylindrical shape, and a pair of ends or end walls 32, 34. One of the end walls 34 is formed by a piston or plunger 36 which can move along the axis of the chamber to change the length of the chamber. A plunger moving means 38 which includes a plunger motor 40 with a gear on its outward shaft that engages a gear rack on a plunger rod 42, moves the plunger. In FIG. 1, the transducers are energized at a frequency which produces a levitation location 26 that lies halfway between the ends of the chamber. When the plunger moves up to the position 36*a*, the object 12 moves up to the position 26*a* at which it lies within a heated portion 44 of the chamber. A heating coil 46 is shown surrounding this portion of the chamber to heat it, although a wide variety of means is available to heat an object within the chamber. During upward movement of the plunger, the chamber lengthens, and the frequency of the transducers must be reduced to maintain a single frequency resonant cylindrical mode that supports the object about halfway between the ends of the chamber.

The cylindrical single frequency resonant mode which acoustically levitates the object 12, can be established by a single transducer such as 22 which is coupled to a cylinder location 50 which is substantially at an end of the chamber and substantially at the periphery of the chamber at the end. The acoustic waves emanating from the location 50 "bounce" off the side walls of the chamber while moving along the length of the chamber and reflecting off the end walls. As the length of the chamber changes, the frequency of the transducer may be such that its frequency can also produce other resonant modes which will interfere with the levitation forces. Most of these degeneracies (frequency at which both the unwanted and wanted modes are created) are insignificant. The most important unwanted modes that are created are the plane wave modes wherein plane (instead of curved) waves "bounce" merely between opposite ends of the chamber. It is important to avoid such a degeneracy in order to maintain the levitation forces. It may be noted that while plane waves could be useful in levitating an object between the end walls, the plane waves would not prevent the object from drifting against a side wall, and an additional transducer would be required to prevent such sideward drifting; a single frequency resonant cylindrical mode can levitate an object against drifting in any direction using a single transducer.

In accordance with the present invention, plane wave degenerate modes are avoided by the use of two transducers 22, 24 that are coupled to diametrically opposite locations 50, 52 of the cylindrical chamber. Also, the transducers 22, 24 are driven so they are substantially 180° out of phase. By having the transducers about 180° out of phase, any plane waves that the transducers might tend to generate are cancelled, and yet single frequency cylindrical resonant levitation modes are produced. The transducers are driven by an oscillator 54 whose output is amplified by an amplifier 56. The output of the amplifier 56 is delivered directly to one transducer 22. The output of the amplifier 56 is also delivered to a 180° phase change circuit 58 whose output is delivered to the other transducer 24. As the length of the chamber increases, the resonant frequency must be decreased to maintain resonance. A modulation oscillator 60 delivers a low frequency signal which modulates the output of the oscillator 54. Acoustic energy of the low modulation frequency has no substantial effect on levitation of the object. A microphone 62 measures pressure in the acoustic chamber at the modulation signal frequency. A phase sensitive detector 64 measures the magnitude and sign of the modulation signal to readjust the frequency of the oscillator 54 to continuously maintain chamber resonance. A computer 66 which operates the plunger motor 40 to lengthen and shorten the chamber, can also be coupled to the oscillators and phase detector to automatically control the system.

The apparatus of FIG. 1 can be operated by placing the object to be levitated on a screen holder 70 that is inserted through a closeable port 72 of a means 74 for establishing the object in the chamber. The holder 70 initially holds the object near the desired levitation position when the plunger is at a downward position. Once the acoustic waves are established in the chamber to raise the object slightly off the holder, the holder can, if desired, be removed from the middle of the chamber. The plunger 36 can be gradually raised to the position **36*a*, to raise the object to the position 26*a*. The heating coils 46** can be energized before, during, or after raising the object, to heat the object to its molten state, and the piston can then be lowered while the frequency is changed, to lower the object to the cooler, lower portion of the chamber where the object will solidify.

The frequency of acoustic energy for producing a cylindrical resonant levitation mode in a cylindrical chamber, is as given by the following equation:

$$f=c/2a[0.34+(a/1)^2n^2]^{\frac{1}{2}} \quad (1)$$

where f is the frequency of said acoustic energy, c is the velocity of sound in the gas within the chamber, a is the radius of the chamber, 1 is the length of the chamber, and n is an integer in the range of 2 to 20 inclusive. When such a frequency is applied at an end wall of the chamber, an object can be levitated along the axis of the chamber at one of perhaps many different levitation positions.

Figure 4:
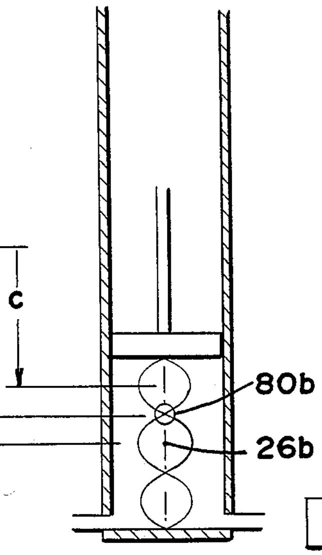
FIG. 4 is a view similar to FIG. 3, but with the piston moved downwardly.
Figure 5:
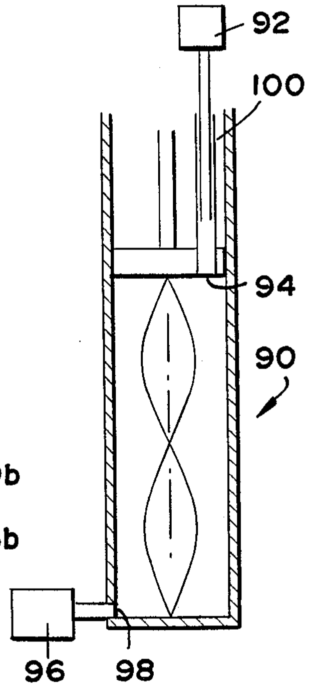
FIG. 5 is a sectional view of a system constructed in accordance with another embodiment of the invention.

The number of levitation positions equals n−1. Thus, when n is 2, there is a single levitation position, indicated at 26 in FIG. 1, which is located halfway between the opposite ends of the chamber. When n equals 3, there are two levitation positions indicated at 80 and 82 in FIG. 3, with each levitation position located one-third of the length of the chamber away from an end wall. For any number n, the levitation positions will be evenly spaced along the axis of the chamber, with half the levitation positions nearest either end of the chamber. The number n is preferably no more than about 20, in as much as when n increases to a high level the frequency increases accordingly, and there is more possibility of degeneracies and it is more difficult to maintain resonance. It is noted that lines indicating acoustic waves are shown in FIGS. 3–5, but they represent only the variation in levitation forces along the cylindrical axis, not at other locations.

While it may appear that the lowest single frequency resonant cylindrical mode, n equals 2, is most useful, with the object located halfway between the opposite ends of the chamber, this is not necessarily the case. FIG. 3 illustrates a portion of the apparatus of FIG. 2, but with the transducers driven so that n equals 3 to produce two levitation positions 80, 82. The object 12 can then be positioned at the levitation position 80 which is closest to the plunger 36. (Another object could be positioned at the other levitation position 82.) Then when the plunger moves, the object 80 will move a distance B which is more than if located at position 26. FIG. 4 shows the apparatus of FIG. 3 but with the plunger 36 moved halfway down from the position in FIG. 3. If the object were at the halfway levitation position 26, then it would move down a distance A to the position **26*b* in FIG. 4**. The distance B is 50% greater than the distance A, so that the object moves by a greater amount by using a higher resonant mode (and the object is at a levitation position closest to the piston) than when the lowest cylindrical resonant mode (n equals 2) is used.

Figure 3:
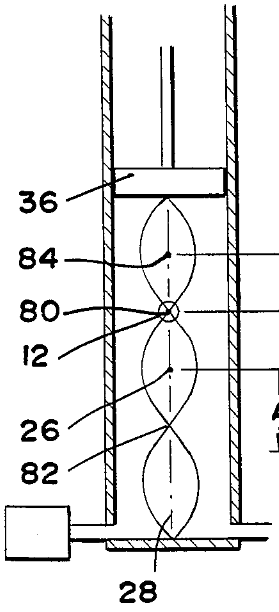
FIG. 3 is a view of a portion of a system of FIG. 1, indicating a second from lowest cylindrical resonant levitation mode in the chamber.

FIG. 3 indicates another levitation position 84 which is produced when n equals 6. The object then moves the distance C when the chamber length is reduced by half, with the distance C being about 67% greater than the distance A. Thus, greater movement of an object is obtained by using a resonant mode greater than n equals 2, with the object nearest the moving end of the chamber.

Although the outputs of the two transducers should each be coupled to an end of the chamber and at diametrically opposite sides of the chamber, it is not necessary that the coupling locations be at the same end of the chamber. FIG. 5 shows an apparatus 90 where one of the transducers 92 is coupled to a location 94 which is at an end of the chamber opposite the end where the other transducer 96 is coupled, at the location 98. A telescoping arrangement 100 is used to couple the transducer to the moving end of the chamber.

Figure 6:
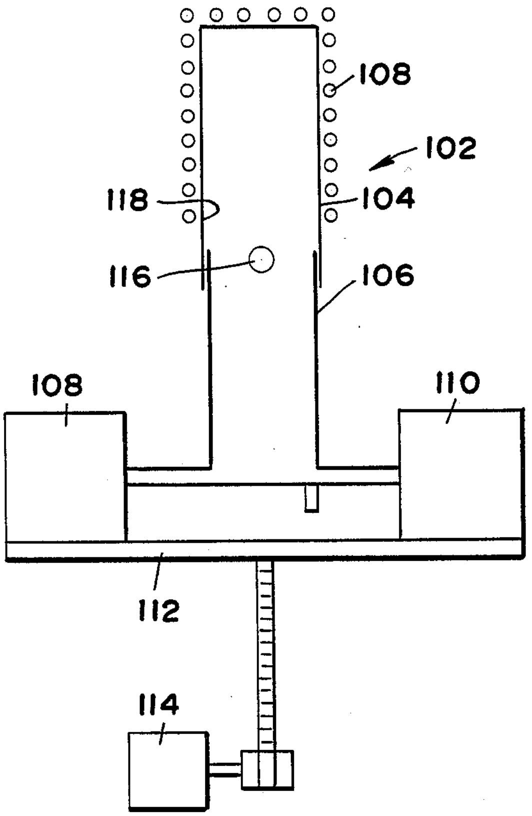
FIG. 6 is a sectional side view of a system constructed in accordance with another embodiment of the invention.

FIG. 6 illustrates another apparatus 102 wherein the chamber includes two telescoping portions 104, 106. The end of the chamber at the telescoping portion 104 is heated by a heating means 108, while the opposite end of the chamber at the telescoping portion 106 is cold. The transducers 108, 110 and the lower telescoping portion are mounted on a platform 112 that can be moved up and down by a motor 114 to change the length of the chamber to move the object 116 up into the heated portion 118 of the chamber or down into the cool lower portion of the chamber.

Figure 7:
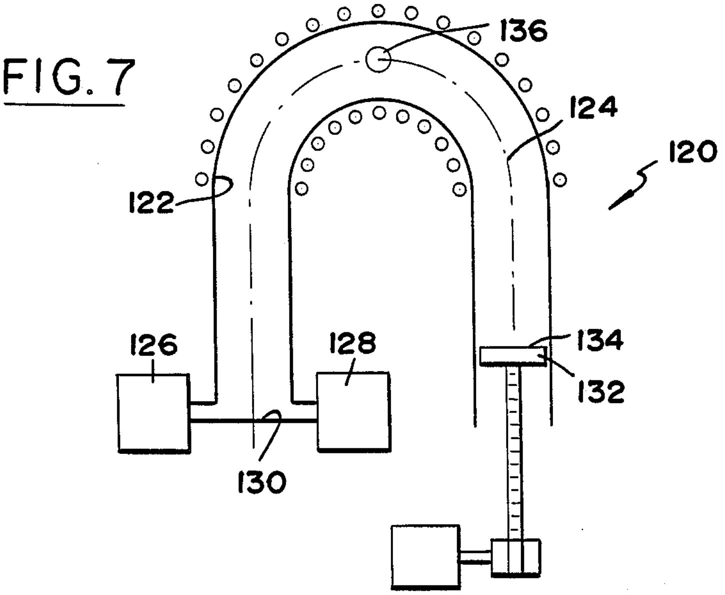
FIG. 7 is a sectional side view of a system constructed in accordance with another embodiment of the invention.

FIG. 7 illustrates another system 120 wherein the chamber 122 is U-shaped, so that it is in the form of a bent cylinder wherein the axis 124 of the cylinder has a 180° bend at the middle of the chamber. A pair of transducers 126, 128 are located on diametrically opposite sides of one end 130 of the chamber. A plunger 132 forms the opposite end of the chamber on the opposite side of the bent middle portion. By driving the transducers at a frequency to establish the lowest cylindrical resonant acoustic mode in the chamber (n equals 2) the object 136 is maintained halfway between the opposite ends of the chamber (as measured along the axis 124) and is urged toward the axis 124. It may be noted that, under the influence of gravity, the object does not lie centered on a levitation position, but lies slightly below it at a location where the force of gravity is balanced by the levitation acoustic force.

Figure 8:
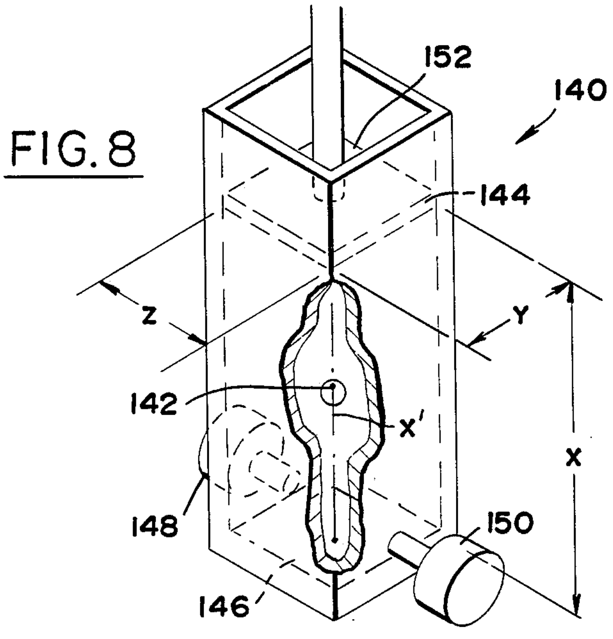
FIG. 8 is a perspective view of a system constructed in accordance with another embodiment of the invention.

FIG. 8 illustrates another system 140 where the chamber is of rectangular cross-section, and therefore of parallelepiped shape, having dimensions x, y and z. To levitate an object along the x axis, labeled x', by a single frequency, the acoustic energy of the following frequency is applied:

$$f=c/2x[n^2+4(x/y)^2+(x/z)^2]^{\frac{1}{2}} \qquad (2)$$

where f is the frequency of a single frequency resonant mode, x is the length of the chamber along the x axis, y is the width of the chamber, z is the depth of the chamber, c is the velocity of sound in the fluid (usually gas) within the chamber, and n is a positive integer between 2 and 20. If n equals 2, the object will be urged toward the levitation position 142 which is halfway between the opposite end walls 144, 146 of the chamber. A number of levitation positions equal to $n-1$ are created. Two transducers 148, 150 are located on opposite sides of an end of the chamber, so they are spaced along the z or y directions, are driven at the same resonant frequency given above, but 180° out of phase. One chamber end wall 144 is formed by a moveable piston 152. With n equaling more than 2, and with the object at the levitation position closest to the piston, the object moves by a greater percentage of piston movement.

In all of the above systems, most of the volume of each chamber is occupied primarily by gas, and each object such as 12 in FIG. 1 occupies less than one-tenth the volume of the chamber. If the volume of the object is more than about one-tenth of the chamber volume then the volume of the object will begin to have a major effect on the acoustic pattern and major adjustments to the frequency and the apparatus may have to be made. For object volumes less than about 20% of chamber volume, the frequency can be more precisely calculated by decreasing the frequency calculated by equations 1 and 2, by an amount $f'=0.76\ Vs/Vc$, where $f'$ is the percent decrease in frequency, Vs is the volume of the sample, or object, and Vc is the volume of the chamber.

Applicant has demonstrated the translation technique of the invention using a transparent cylindrical cylinder having a radius of 2.05 cm and a length adjustable between about 10 cm and 22 cm. The tests were carried out at 25° C. (at a sound velocity of 34644 cm/sec) at the cylindrical mode corresponding to n equals 2. As the length varied from 10 cm to 22 cm, the resonant frequency decreased over the range of about 5 kHz to 3.5 kHz. A 1 cm diameter styrofoam sample was translated back and forth along the cylinder axis by a distance of about 5 cm. During this translation, the sample was held stable without rotation or excessive oscillations.

Thus, the invention provides a method and apparatus for the levitation of an object within a chamber, and for the controlled movement of the object, by the application of a single frequency for levitating the object at a location where acoustic force resists movement of the object in every direction. Degeneracies (two resonant modes of the same frequency), especially those which would include plane waves, are avoided by applying the same frequency at diametrically opposite sides of the chamber, but with the acoustic waves at the opposite sides being about 180° out of phase. This transducer orientation minimizes the generation of plane waves as the chamber length passes through certain lengths at which plane wave modes would otherwise be generated. The object is moved by changing the length of the chamber.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for acoustically levitating an object comprising:

walls forming a chamber which has an axis and opposite ends;

transducer means for applying acoustic energy of a frequency which is resonant to said chamber, said acoustic energy being of a single frequency resonant mode which urges an object to at least one position which lies substantially along said axis of the chamber and which is spaced from an end of the chamber;

said transducer means applies said energy to locations at opposite sides of the chamber, each location lying at an end of the chamber, with the acoustic energy being substantially 180° out of phase at the opposite side locations, whereby to avoid establishing unwanted plane wave resonant modes along the dimension of the chamber which is separated by said ends.

2. The apparatus described in claim 1 including:

an object lying in said chamber and occupying less than one-tenth the chamber volume, and gas occupying substantially the rest of the chamber volume.

3. Apparatus for acoustically levitating an object comprising:

walls forming a largely cylindrical chamber having an axis and opposite ends and containing gas, the volume of the chamber being at least ten times the volume of the object;

a pair of transducers, each coupled to locations that are each at an end of the chamber near the periphery of the chamber, said locations lying on substantially diametrically opposite sides of the chamber;

means for driving said transducers at the same frequency but substantially 180° out of phase, said means driving said transducers at a frequency substantially as given by the following equation:

$$f=c/2a\ [0.34+(a/l)^2n^2]^{\frac{1}{2}}$$

where c is the velocity of sound in the gas within the chamber, a is the radius of the chamber, 1 is the length of the chamber, and n is an integer in the range of 2 to 20 inclusive.

4. Apparatus for acoustically levitating an object even while the environment around the object changes in temperature comprising:

walls forming a primarily gas-filled chamber which has an axis and opposite ends through which said axis passes, one of said ends being moveable toward and away from the other end;

variable frequency transducer means for applying acoustic energy to an end of the chamber of a single resonant frequency mode which is resonant to the chamber and which establishes a single frequency resonant mode which applies force in three dimensions that urges the object toward a levitation location within the chamber that lies along said axis;

means for moving said moveable end of said chamber, to thereby move the levitation location;

means coupled to said variable frequency transducer means, for sensing the degree of resonance of the acoustic energy in said chamber and for varying the frequency of acoustic energy applied by said transducer means to maintain a high degree of acoustic resonance of said single frequency resonant mode in the chamber.

5. A method for levitating an object within a largely cylindrical chamber containing gas comprising:

applying acoustic energy of a frequency which establishes a single frequency resonant mode in the chamber, to two chamber locations which are each at substantially an end of the chamber and substantially at the periphery of the chamber;

said locations being on substantially opposite sides of the chamber, and the acoustic energy at said two locations being substantially 180° out of phase.

6. The method described in claim 5 wherein:

said single resonant frequency mode establishes at least two levitation locations along an axis passing through a pair of opposite ends of the chamber to provide a levitation location closest to a first of said ends of the chamber, where the levitation location is closer to said first end than one-half the chamber length; and including establishing said object at said levitation location closest to said first end of said chamber; and moving said first end of the chamber, to thereby move the object.

7. Apparatus for acoustically levitating an object comprising:

walls forming a substantially cylindrical chamber which has an axis and opposite cylinder ends;

an object lying in said chamber and occupying less than one-tenth the chamber volume, and gas occupying substantially the rest of the chamber volume;

transducer means for applying acoustic energy of a frequency which is resonant to said chamber, said acoustic energy being of a single frequency resonant mode which urges an object to at least one position which lies substantially along said axis of the chamber and which is spaced from an end of the chamber, said mode having a frequency f given substantially by the following equation:

$$f=(c/2a)\,[0.34+(a/1)^2 n^2]^{\frac{1}{2}}$$

where f is the frequency of said acoustic energy, c is the velocity of sound in the gas within the chamber, a is the radius of the chamber, 1 is the length of the chamber, and n is an integer in the range of 2 to 20 inclusive;

said transducer means applies said energy to locations at opposite sides of the chamber, each location lying at an end of the chamber, with the acoustic energy being substantially 180° out of phase at the opposite side locations, whereby to avoid establishing unwanted plane wave resonant modes along the dimension of the chamber which is separated by said ends.

8. The apparatus described in claim 7 wherein:

said walls that form said chamber includes a moveable plunger forming one end of said chamber, and including means for moving the plunger along the axis of the chamber;

said integer is at least 3, to thereby create a plurality of levitation positions along the length of the chamber; and means for establishing said object in a levitation position which is closer to the end of the chamber where the plunger is located, than to the opposite end, whereby to obtain large object movement.

9. The apparatus described in claim 7 wherein:

said largely cylindrical chamber is curved so its axis extends in a U-shape, and said chamber walls include a moveable plunger forming one chamber end;

means for heating the middle of the chamber which is about halfway between its ends; and said integer is 2.

10. Apparatus for acoustically levitating an object comprising:

walls forming a chamber of parallelepiped shape which has an axis and opposite ends;

an object lying in said chamber and occupying less than one-tenth the chamber volume, and gas occupying substantially the rest of the chamber volume;

transducer means for applying acoustic energy of a frequency which is resonant to said chamber, said acoustic energy being of a single frequency resonant mode which urges an object to at least one position which lies substantially along said axis of the chamber and which is spaced from an end of the chamber, said mode having a frequency given substantially by the following equation:

$$f=(c/2x)\,[n^2+4(x/y)^2+(x/y)^2]^{\frac{1}{2}}$$

where f is the frequency of said acoustic energy, c is the velocity of sound in the gas within the chamber, x is the length of the chamber which separates said opposite ends and said axis extends through the middle of said ends, y is the width of said chamber, z is the depth of said chamber, and n is an integer in the range of 2 to 20 inclusive;

said transducer means applies said energy to locations at opposite sides of the chamber, with the acoustic energy being substantially 180° out of phase at the opposite side locations, whereby to avoid establishing unwanted plane wave resonant modes along the dimension of the chamber which is separated by said ends.

11. The apparatus described in claim 10 wherein:

said walls that form said chamber includes a moveable plunger forming one end of said chamber, and including means for moving the plunger along the axis of the chamber;

said integer is at least 3, to thereby create a plurality of levitation positions along the length of the chamber; and means for establishing said object in a levitation position which is closer to the end of the chamber where the plunger is located, than to the opposite end, whereby to obtain large object movement.

12. Apparatus for acoustically levitating an object even while the environment around the object changes in temperature comprising:

walls forming a primarily gas-filled chamber that is substantially cylindrical and which has an axis and opposite ends through which said axis passes, one of said ends being moveable toward and away from the other end;

variable frequency transducer means for applying acoustic energy to an end of the chamber of a single resonant frequency mode which is resonant to the chamber and which establishes a single frequency resonant mode which applies force in three dimensions that urges the object toward a levitation location within the chamber that lies along said axis, the frequency of acoustic energy being given substantially by the following equation:

$$f=(c/2a)\,[0.34+(a/1)^2n^2]^{\frac{1}{2}}$$

where c is the velocity of sound in the gas within the chamber, a is the radius of the chamber, 1 is the length of the chamber, and n is an integer;

the integer n being between 3 and 20 to form at least one levitation position closer to the moveable end of the chamber than the opposite end, whereby to enable large object movement;

means for moving said moveable end of said chamber, to thereby move the levitation location;

means coupled to said variable frequency transducer means, for sensing the degree of resonance of the acoustic energy in said chamber and for varying the frequency of acoustic energy applied by said transducer means to maintain a high degree of acoustic resonance of said single frequency resonant mode in the chamber.

13. Apparatus for acoustically levitating an object even while the environment around the object changes in temperature comprising:

walls forming a primarily gas-filled chamber that is of parallelepiped shape and which has an axis and opposite ends through which said axis passes, one of said ends being moveable toward and away from the other end;

variable frequency transducer means for applying acoustic energy to an end of the chamber of a single resonant frequency mode which is resonant to the chamber and which establishes a single frequency resonant mode which applies force in three dimensions that urges the object toward a levitation location within the chamber that lies along said axis, the frequency of acoustic energy being given substantially by the following equation:

$$f=(c/2x)\,[n^2+4(x/y)^2+(x/y)^2]^{\frac{1}{2}}$$

where c is the velocity of sound in the gas within the chamber, a is the radius of the chamber, 1 is the length of the chamber, and n is an integer;

the integer n being between 3 and 20 to form at least one levitation position closer to the moveable end of the chamber than the opposite end, whereby to enable large object movement;

means for moving said moveable end of said chamber, to thereby move the levitation location;

means coupled to said variable frequency transducer means, for sensing the degree of resonance of the acoustic energy in said chamber and for varying the frequency of acoustic energy applied by said transducer means to maintain a high degree of acoustic resonance of said single frequency resonant mode in the chamber.

* * * * *